United States Patent
Jiang et al.

(10) Patent No.: US 7,436,656 B2
(45) Date of Patent: Oct. 14, 2008

(54) PORTABLE COMPUTER HAVING IMPROVED LATCH MECHANISM

(75) Inventors: Xiao-Gang Jiang, Shenzhen (CN); Ke-Cheng Lin, Tu-Cheng (TW); Qi-Fei Fan, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 448 days.

(21) Appl. No.: 11/188,548

(22) Filed: Jul. 25, 2005

(65) Prior Publication Data

US 2006/0109637 A1    May 25, 2006

(30) Foreign Application Priority Data

Nov. 24, 2004  (CN) .................... 2004 2 0095831 U

(51) Int. Cl.
*H05K 5/00* (2006.01)
*H05K 7/00* (2006.01)
*E05B 69/00* (2006.01)
*E05B 73/00* (2006.01)

(52) U.S. Cl. ......................................... 361/683; 70/58
(58) Field of Classification Search .................... 70/67, 70/69–74, 58; 361/680, 681, 683–686
See application file for complete search history.

(56) References Cited

U.S. PATENT DOCUMENTS 5,580,182 A * 12/1996 Lin ............................ 403/325
5,954,531 A * 9/1999 Jennings et al. ............. 439/352
6,076,869 A    6/2000 Chen et al.
6,244,889 B1 * 6/2001 James ......................... 439/352
6,517,129 B1 * 2/2003 Chien et al. ................ 292/251.5
6,535,380 B1 * 3/2003 Lee et al. ..................... 361/683
6,779,441 B2 * 8/2004 Jun ............................. 101/3.1
6,937,465 B2 * 8/2005 Park ............................ 361/683
7,173,816 B2 * 2/2007 Song ........................... 361/683
2002/0163201 A1 * 11/2002 Schlack et al. ................ 292/52
2003/0142472 A1 * 7/2003 Park ............................ 361/683
2005/0276010 A1 * 12/2005 Song ........................... 361/683
2006/0133019 A1 * 6/2006 Yamazaki et al. ............. 361/683

FOREIGN PATENT DOCUMENTS

CN          01208955.9         3/2002

* cited by examiner

*Primary Examiner*—Jayprakash N Gandhi
*Assistant Examiner*—Anthony M Haughton
(74) *Attorney, Agent, or Firm*—Morris Manning Martin LLP; Tim Tingkang Xia, Esq.

(57) ABSTRACT

A portable computer includes a cover unit (1) and a base unit (2) connected with the cover unit. The cover unit includes a pair of spaced movable latch members (40). A flexible connecting member (50) is connected between the latch members. A driving member (30) is manipulated to bend the connecting member thereby moving the latch members. The cover unit is latched to the base unit via the latch members to cover the base unit and unlatched from the base unit via moving the latch members by manipulation of the driving member.

16 Claims, 5 Drawing Sheets

PORTABLE COMPUTER HAVING IMPROVED LATCH MECHANISM

BACKGROUND OF THE INVENTION

1. Field of the Invention

The present invention relates to a portable computer, and more particularly to a portable computer which includes a reliable latch mechanism.

2. General Background

Portable computers, such as laptop computers and notebook computers, have become increasingly popular for general use. Generally, a portable computer includes a cover unit and a base unit pivotally connected with the cover unit, and the cover unit is folded onto the base unit to cover the base unit when the portable computer is not in use. A latch mechanism is provided to lock the cover unit to the base unit.

As disclosed in China Patent No. 01208955.9, a portable computer includes a latch mechanism which acts to lock a cover unit to a base unit when the portable computer is not in use. The latch mechanism includes a hook for engaging the base unit, and a post movably embedded in the base unit for disengaging the hook from the base unit. An end portion of the post is exposed outside the base unit for facilitating pushing the post to disengage the hook from the base unit. However, the end portion of the post is liable to be accidentally touched resulting in undesired opening of the cover unit.

What is desired, therefore, is a portable computer which has an improved reliable latch mechanism.

SUMMARY

In one preferred embodiment, a portable computer includes a cover unit and a base unit connected with the cover unit. The cover unit includes a pair of spaced movable latch members. A flexible connecting member is connected between the latch members. A driving member is manipulated to bend the connecting member thereby moving the latch members. The cover unit is latched to the base unit via the latch members to cover the base unit and unlatched from the base unit via moving the latch members by manipulation of the driving member.

Other advantages and novel features will become more apparent from the following detailed description of preferred embodiments when taken in conjunction with the accompanying drawings, in which:

DETAILED DESCRIPTION OF THE EMBODIMENT

Figure 1:
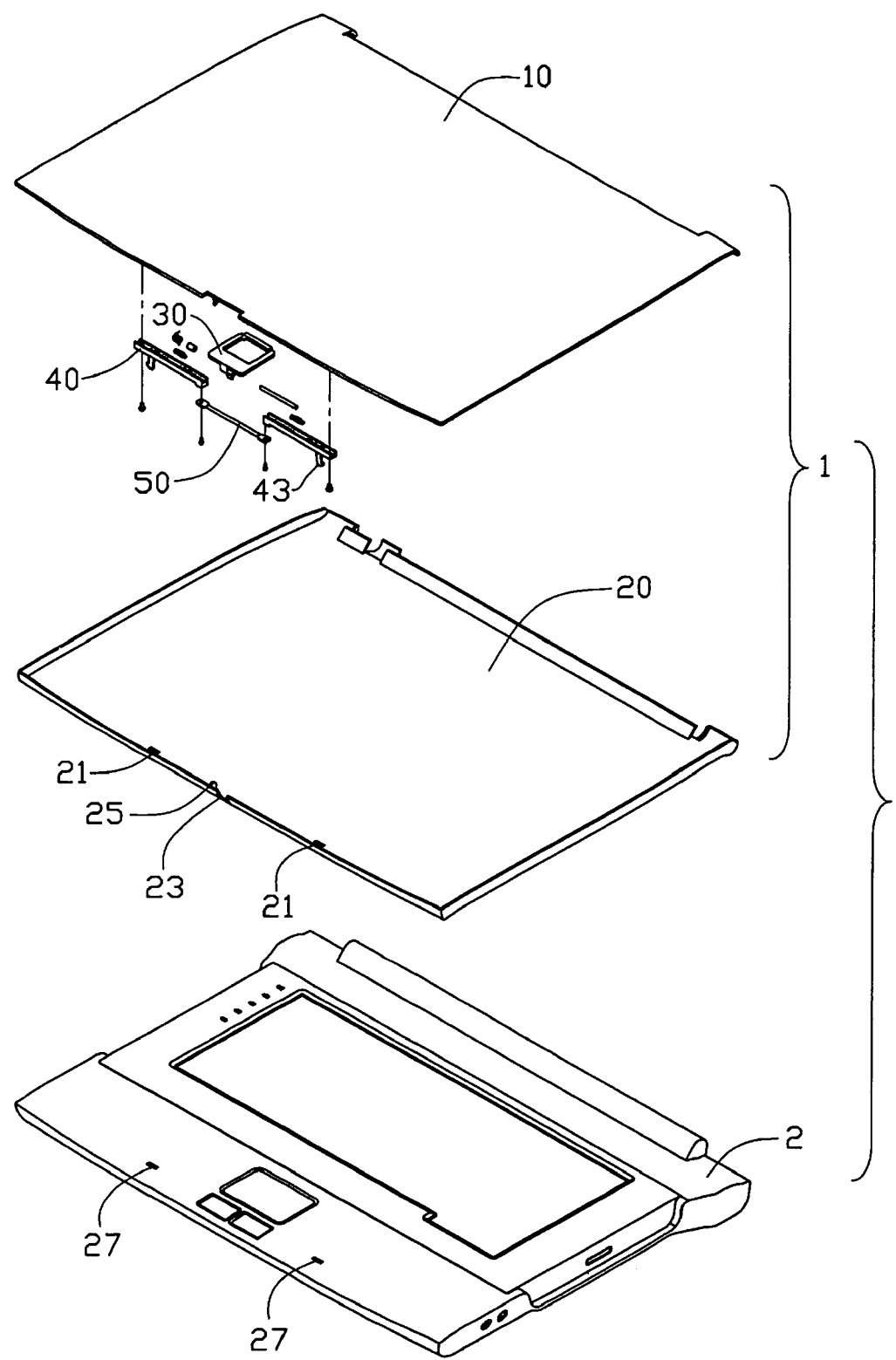
FIG. 1 is an exploded, isometric view of a portable computer in accordance with a preferred embodiment of the present invention, the portable computer including a base unit, a cover unit and a latch mechanism.
Figure 2:
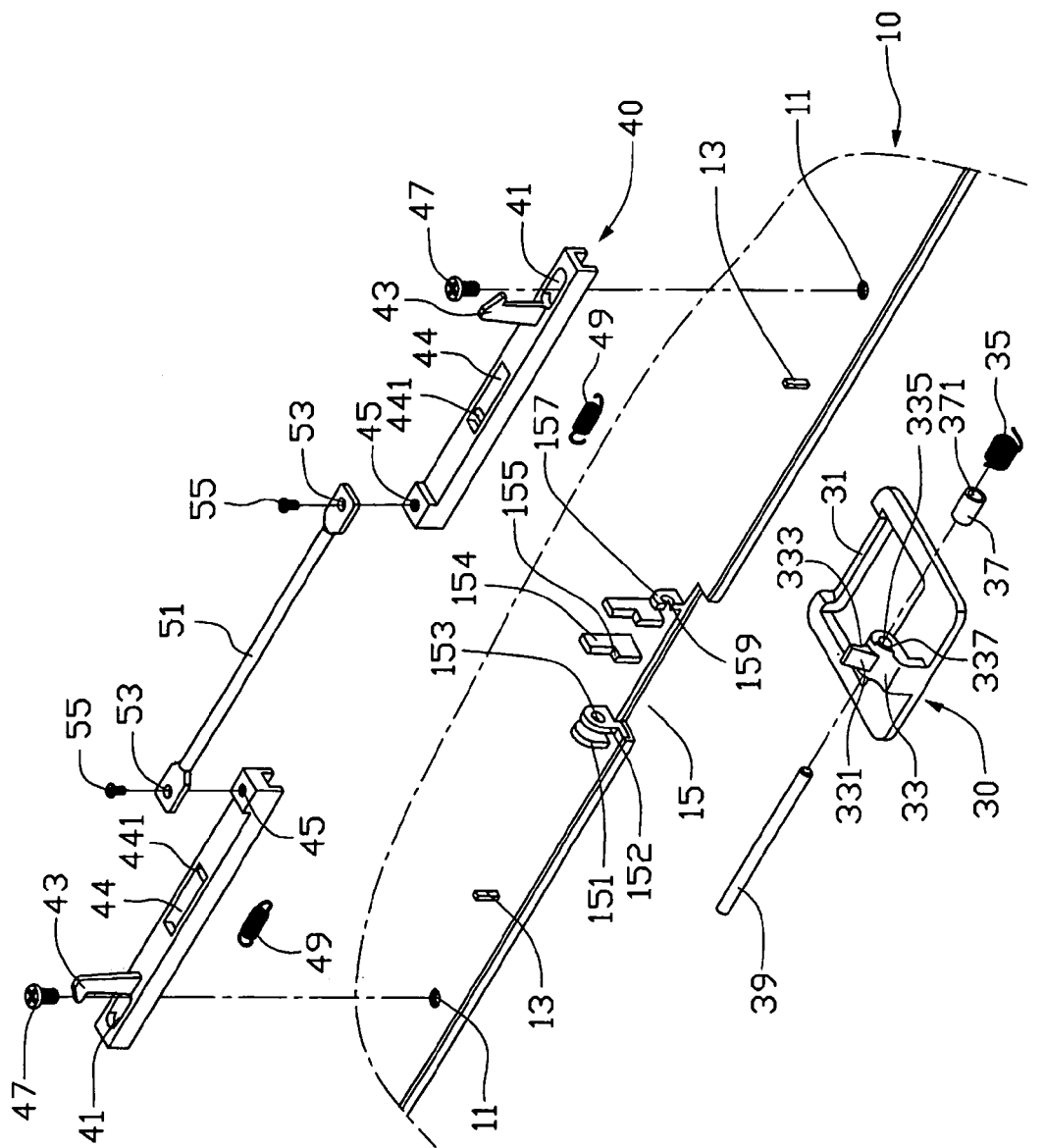
FIG. 2 is an enlarged isometric view of part of the cover unit and the latch mechanism of FIG. 1, but viewed from another aspect.

Referring to FIGS. 1 and 2, a portable electronic device like a portable computer includes a cover unit 1 and a base unit 2 pivotally connected to a rear portion of the cover unit 1. The cover unit 1 includes a latch mechanism disposed at a front portion thereof for locking the cover unit 1 to the base unit 2 when the portable computer is not in use.

The latch mechanism includes a driving member 30 generally disposed at external surface of the cover unit 1 for facilitating manipulating the latch mechanism, a pair of latch members 40, and a connecting member 50 connected between the latch members 40.

The cover unit 1 includes a panel 10 and a housing 20. A pair of spaced threaded holes 11 is defined at an internal side of the panel 10 adjacent a front edge. A pair of posts 13 depends from the internal side of the panel 10 adjacent the threaded holes 11 respectively. A cutout 15 is defined between the posts 13 by cutting rearward from the front edge of the panel 10. A first projection 152 is formed adjacent the cutout 15 with a through hole 153 defined therein, and a first stopper 151 is arranged adjacent the first projection 152. A pair of spaced L-shaped tabs 154 is arranged at the rear of the cutout 15, each tab 154 defining an arcuate bearing surface 155. A second projection 157 is formed parallel to the first projection 152. Antic 159 is defined in the second projection 157 in alignment with the through hole 153 of the first projection 152.

Referring particularly to FIG. 1, the housing 20 defines a pair of apertures 21. An opening 23 is defined in a front wall of the housing 20, and a second stopper 25 is arranged adjacent the opening 23.

As shown in FIG. 2, the driving member 30 is generally rectangle shaped. A handgrip portion 31 is formed at a rear edge portion of the driving member 30, and a protrusion 33 protrudes downward from a front edge portion of the driving member 30 and then extends slantingly toward the rear edge portion thereof ending with an essentially cylindrical end portion. A pivot hole 335 is defined through a free end of the protrusion 33. A driving portion 331 is formed on the end portion of the protrusion 33, with a concave portion 333 defined at the driving portion 331. A flange 337 protrudes outward from the end portion adjacent the pivot hole 335. A shaft 39 is provided to attach the driving member 30 to the panel 10.

Each latch member 40 includes a longitudinal body defining a slot 41 in a first end portion thereof, the slot 41 corresponding to a respective threaded hole 11 of the panel 10. A hook 43 is arranged adjacent the slot 41 corresponding to a respective aperture 21 of the housing 20. A groove 44 is defined in a middle portion of the body corresponding to a respective post 13 of the panel 10. A beam 441 is arranged in the groove 44 in cooperation with the respective post 13 to attach a coil spring 49 in the groove 44. A threaded hole 45 is defined in a second end portion of the body.

The connecting member 50 includes a flexible strip 51. A pair of holes 53 is defined in opposite ends of the connecting member 50 corresponding to the threaded holes 45 of the latch members 40. A pair of screws 55 is provided to attach the connecting member 50 to the latch members 40.

Referring back to FIG. 1, the base 2 defines a pair of apertures 27 at a front portion thereof corresponding to the hooks 43 of the latch members 40 respectively as complementary parts of the latch members 40.

In assembly, the driving member 30 is positioned relative to the panel 10, with the driving member 30 engaging an external surface of the panel 10 and overlapping the cutout 15 of the panel 10. Part of the end portion of the protrusion 33 of the driving member 30 is positioned between the tabs 154. A torsion spring 35 is provided to mate with a bushing 37. The shaft 39 is extended through the notch 159 of the second projection 157, a through hole 371 of the bushing 37, the pivot hole 335 of the protrusion 33, and the through hole 153 of the first projection 152 in sequence until the first stopper 151 prevents further movement of the shaft 39. Two free ends of the torsion spring 35 engage the flange 337 of the protrusion 33 and the second projection 157 respectively.

The latch members 40 are slidably attached to the panel 10 with two fasteners 47 engaging in the threaded holes 11 respectively. The posts 13 are received in the grooves 44 of the latch members 40 respectively. The coil springs 49 are received in the grooves 44 respectively, each coil spring 49 having two free ends attached to a respective post 13 and a respective beam 441 respectively.

Figure 3:
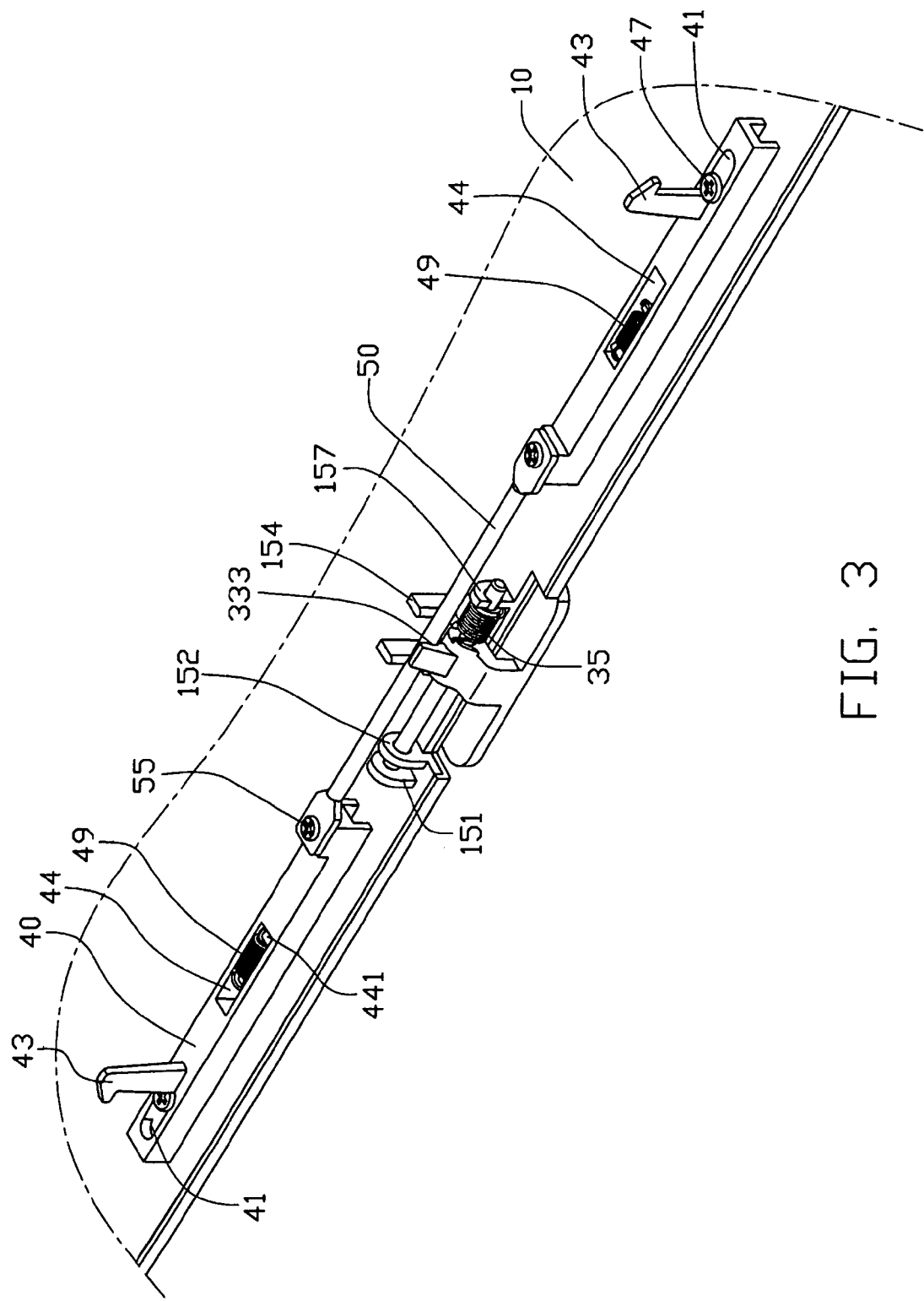
FIGS. 3 and 4 are assembled views of FIG. 2, respectively schematically showing the latch mechanism in different working states.

The connecting member 50 is attached to the latch members 40 with the screws 55 extended through the holes 53 to engage in the threaded holes 45 of the latch members 40 respectively. FIG. 3 shows an assembled view of FIG. 2.

The housing 20 is then assembled with the panel 10 to form the cover unit 1, and the hooks 43 of the latch members 40 protrude outward from the apertures 21 of the housing 20 respectively. The opening 23 of the housing 20 corresponds to the protrusion 33 of the driving member 30 for allowing free rotation of the driving member 30 (see FIG. 5). The second stopper 25 of the housing 20 engages an end of the shaft 39 adjacent the second projection 157 of the panel 10 for preventing axial movement of the shaft 39.

Figure 5:
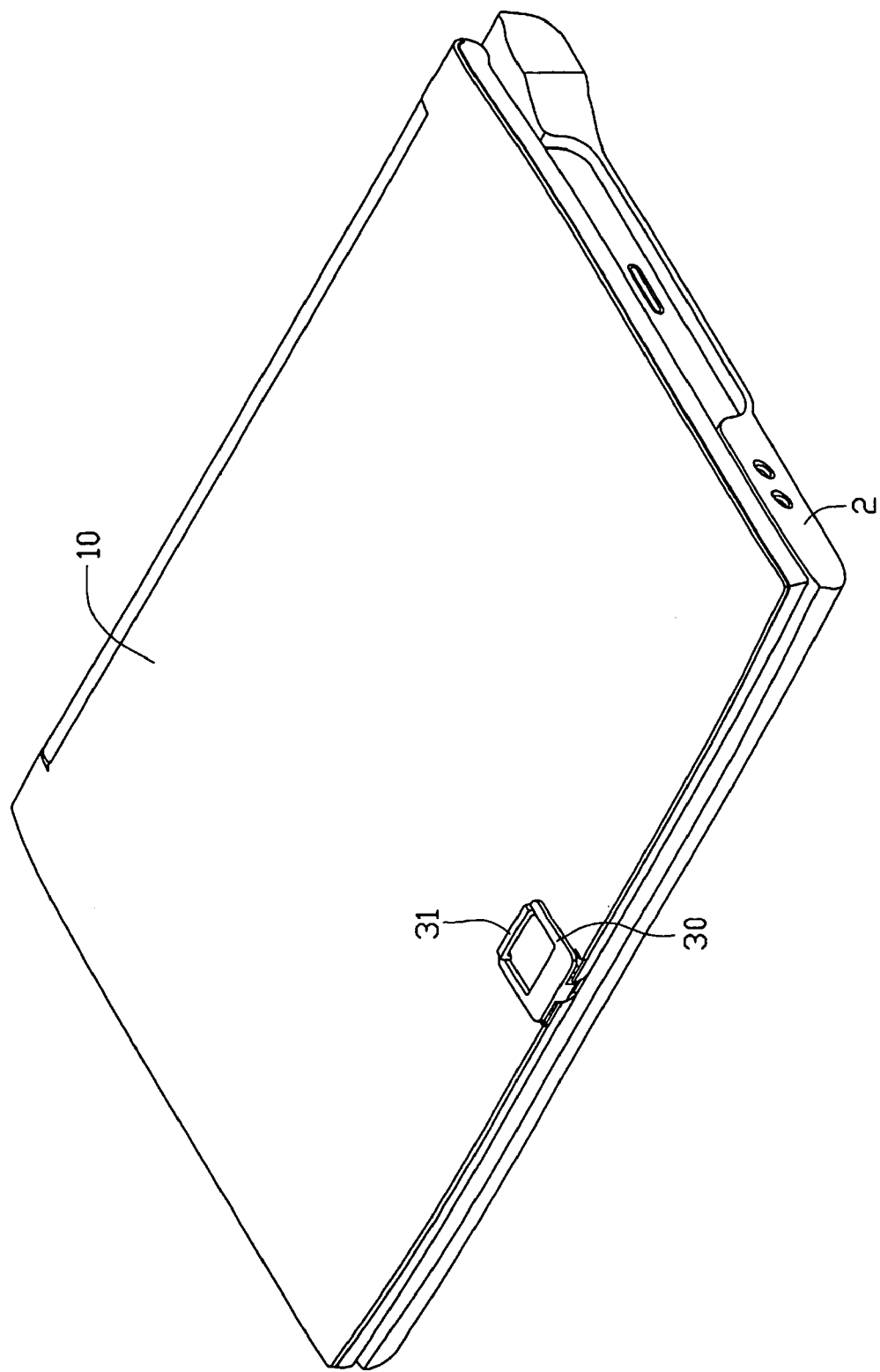
FIG. 5 is an assembled view of FIG. 1.

As shown in FIG. 5, the cover unit 1 is pivotally attached to the base unit 2, and the cover unit 1 is folded to cover the base 2, with hooks 43 engaging in the apertures 27 and latching the base unit 2. FIG. 3 shows the working state of the latch mechanism when the cover unit 1 covers the base unit 2.

Figure 4:
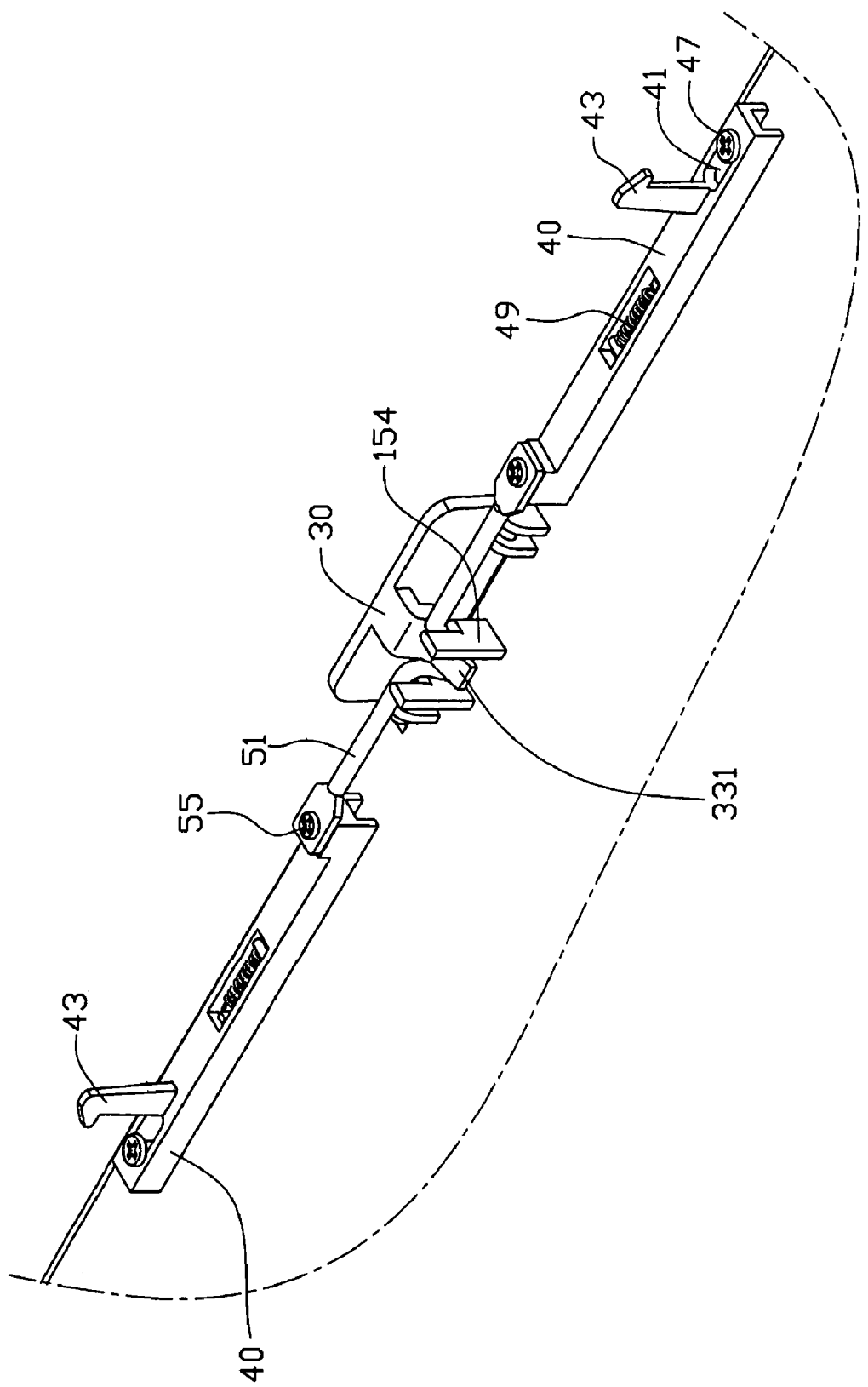

To open the cover unit 1 from the base unit 2, the driving member 30 is lifted up by the handgrip portion 31 and rotated outward. The torsion spring 35 is twisted. As shown in FIG. 4, the concave portion 333 of the driving portion 331 pushes the strip 51 toward between the tabs 154. The strip 51 is bent along the bearing surfaces 155 of the tabs 154 and drives the latch members 40 to move toward each other along the fasteners 47, the hooks 43 are thereby disengaged from the apertures 27 of the base unit 2 respectively. The coil springs 49 are extended out. The cover unit 1 is ready to be opened. When the driving member 30 is released, the torsion spring 35 is restored to rotate the driving member 30 toward the cover unit 1, and the coil springs 49 are restored to move the latch members 40 back respectively.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A portable computer, comprising: a cover unit comprising a pair of spaced movable latch members, a flexible connecting member connected between the latch members, and a driving member manipulated to bend the connecting member thereby moving the latch members; and a base unit connected with the cover unit, the cover unit latched to the base unit via the latch members to cover the base unit and unlatched from the base unit via moving the latch members by manipulation of the driving member, wherein the driving member comprises a bracket and a protrusion defining a pivot hole therein, a shaft is associated with the cover unit and extended through the pivot hole to support pivoting of the driving member, and the protrusion forms a driving portion corresponding to the connecting member.

2. The portable computer as claimed in claim 1, wherein a pair of spaced L-shaped tabs is associated with the cover unit to support the connecting member, and the driving portion of the driving member is rotated to urge the connecting member toward between the tabs.

3. The portable computer as claimed in claim 1, wherein a torsion spring is associated with the driving member to restore the driving member.

4. The portable computer as claimed in claim 3, wherein the torsion spring is attached to the shaft, a flange is formed on the protrusion of the driving member, and a free end of the torsion spring engages the flange.

5. The portable computer as claimed in claim 1, wherein the driving member is generally arranged at an external surface of the cover unit for facilitating manipulating the driving member, and the protrusion of the driving member is generally arranged inside the cover unit.

6. The portable computer as claimed in claim 1, wherein each of the latch members comprises a hook protruding outward from the cover unit, and a pair of apertures is defined in the base unit receiving the hooks respectively.

7. The portable computer as claimed in claim 1, wherein a slot is defined in each of the latch members, and a fastener is extended through the slot to attach each of the latch members to the cover unit.

8. The portable computer as claimed in claim 7, wherein a spring is provided to restore each of the latch members along the fastener after the cover unit is unlatched from the base unit.

9. A combination comprising: a cover unit; a latch mechanism comprising at least one latch member movably received in the cover unit, a connecting member with one end associated with the latch member, and a driving member rotatably attached to the cover unit, said latch member comprising a hook protruding outward from the cover unit; and a base unit defining at least one aperture corresponding to the hook, the hook entering the aperture and latching the base unit to attach the cover unit to the base unit, and the driving member being rotated to drive the connecting member to move said latch member thereby unlatching the hook from the base unit, wherein the connecting member is flexible, and the driving member bends the connecting member, wherein the driving member comprises a protrusion, the driving member is generally arranged at an external surface of the cover unit for facilitating manipulation except that the protrusion is generally arranged inside the cover unit, and the protrusion forms a driving portion corresponding to the connecting member.

10. The combination as claimed in claim 9, wherein the latch mechanism comprises two latch members, and the connecting member is connected between the latch members.

11. The combination as claimed in claim 10, wherein a pair of spaced L-shaped tabs is arranged inside the cover unit to support the connecting member, and the driving member drives the connecting member toward between the tabs.

12. The combination as claimed in claim 9, wherein a torsion spring is associated with the protrusion to restore the driving member.

13. The combination as claimed in claim 9, wherein a slot is defined in said latch member, a fastener is extended through the slot to attach said latch member to the cover unit, and a spring is provided to restore said latch member along the fastener after the cover unit is unlatched from the base unit.

14. A portable electronic device, comprising:
   a cover unit enclosing a part of said portable electronic device;
   a base unit enclosing another part of said portable electronic device;

a pair of latch members spaced from each other and disposed in one of said cover and base units, each of said pair of latch members being resiliently movable between a closer position thereof to each other and a farther position thereof away from each other;

a connecting member capable of urging said each of said pair of latch members moving from said farther position thereof to said closer position thereof; and a pair of complementary parts corresponding to said pair of latch members respectively and disposed in the other of said cover and base units, each of said pair of complementary parts capable of engaging with said each of said pair of latch members in said farther position thereof so as to fixedly attach said cover unit to said base unit, and disengaging from said each of said pair of latch members in said closer position thereof so as to release said cover unit from said base unit; wherein said connecting member is connected to said pair of latch members and flexible to shorten a distance thereof between said pair of latch members in order for urging movement of said each of said pair of latch members from said farther position thereof to said closer position thereof.

15. The portable electronic device as claimed in claim 14, further comprising a driving member disposed next to said connecting member and capable of rotating to drive said connecting member in order for urging movement of said pair of latch members.

16. The portable electronic device as claimed in claim 14, wherein said each of said pair of latch members comprises a hook extending therefrom, and said each of said pair of complementary parts comprises an aperture capable of receiving said hook therein for engagement of said each of said pair of latch members and said each of said pair of complementary parts.

* * * * *